Figure 1:
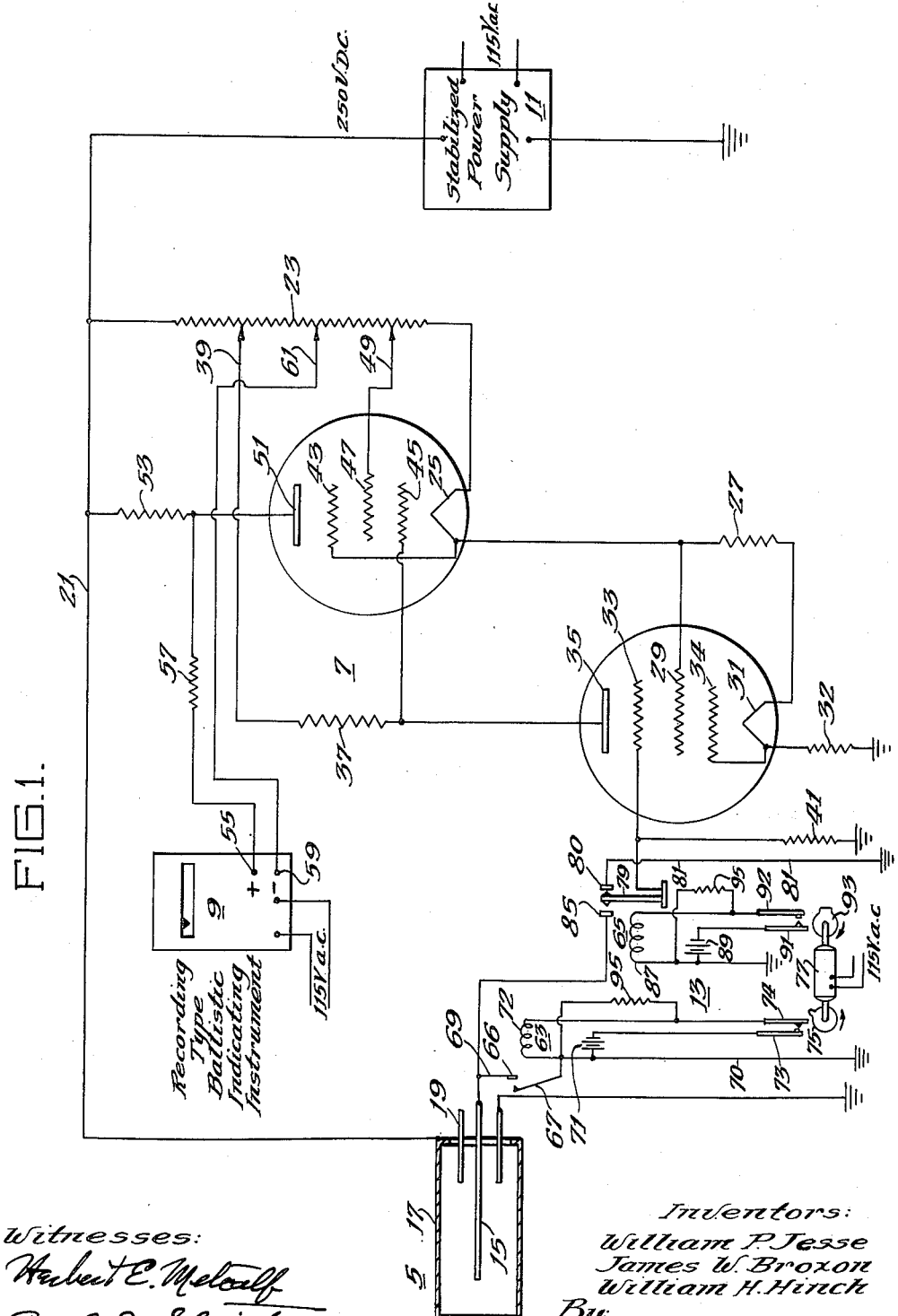

Jan. 6, 1953 — W. P. JESSE ET AL — 2,624,847
BALLISTIC ELECTROMETER
Filed Sept. 4, 1945 — 3 Sheets-Sheet 3

Inventors:
William P. Jesse
James W. Broxon
William H. Hinch

Patented Jan. 6, 1953

2,624,847

UNITED STATES PATENT OFFICE 2,624,847

BALLISTIC ELECTROMETER

William P. Jesse, Chicago, Ill., and James W. Broxon, Boulder, and William H. Hinch, Denver, Colo., assignors to the United States of America as represented by the United States Atomic Energy Commission Application September 4, 1945, Serial No. 614,403

4 Claims. (Cl. 250—83.6)

The present invention relates to apparatus for the detection and measurement of electrical currents of small magnitude, as for example, the very small currents produced in an ion chamber which is subjected to low intensity electro-magnetic radiation.

In the past, it has been more or less common practice to utilize Geiger-Müller counters, or similar devices for the detection of the very small currents occuring in ion chambers as an incident to radiation produced ionization, but there are various difficulties inherent in these devices and the elaborate scaling circuits required in connection therewith which have seriously limited their usefulness. Especially undesirable are the need for the services of highly skilled operators to operate such devices, the relative non-suitability of the devices for accomplishing current measurement, as contrasted with mere detection, and the difficulty of recording the observed phenomenon.

A principal object of the present invention is to provide an improved novel apparatus for the detection, measurement, and recordation of extremely small electric currents, and especially the very small ion currents produced in ion chambers which are subjected to low intensity radiation.

Other objects of the invention include the provision of novel apparatus, in accordance with the stated principal object, which shall be simple in design, which can be constructed of readily available commercial parts, and which, in addition, shall be substantially automatic in its operation.

Figure 2:
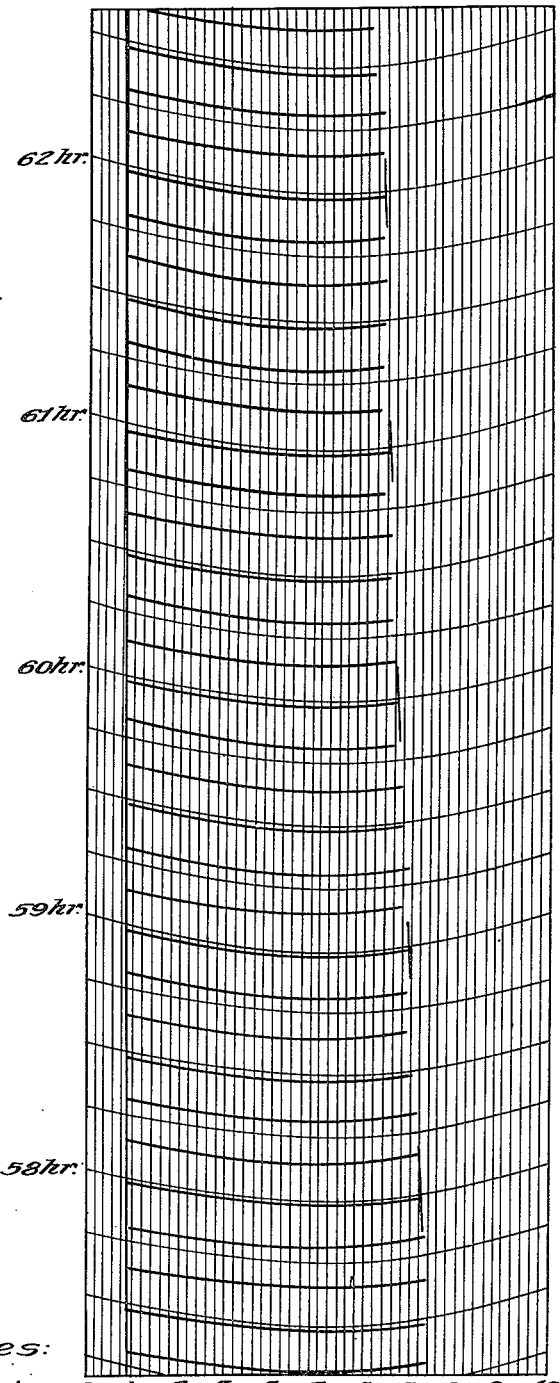
Figure 3:
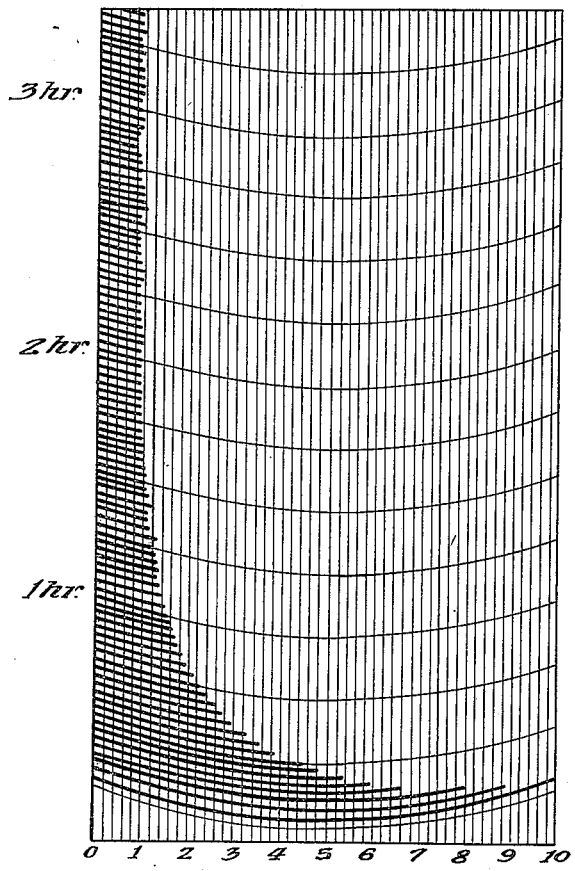

These objects are accomplished by the provision of a novel combination of circuit elements and a novel method of connecting and operating those elements. The various features and advantages of the invention will be made apparent in the following description and the accompanying drawings of one preferred embodiment thereof. In the drawings:

Fig. 1 is a circuit diagram of a measuring and recording apparatus constructed in accordance with the invention; and Figs. 2 and 3 are illustrative reproductions of tape sections from the recording type indicating instrument forming a part of the apparatus illustrated in Fig. 1, the tape sections illustrating different conditions of operation of the apparatus.

Generally stated, the particular embodiment of the invention illustrated in Fig. 1 comprises five main parts. These include, since the apparatus is adapted for the detection and measurement of electromagnetic radiation: an ion chamber 5; a direct current amplifier 7; a recording type, ballistic, indicating instrument 9, connected to receive the output from the amplifier 7; a power supply means 11; and switching means 13, which is automatically operable, to conduct charges collected in the ion chamber 5 to the input side of the direct current amplifier.

The mode of operation of the apparatus is such that a charge is placed upon the electrodes 15 and 17 of the ion chamber 5, and this charge is permitted to decay for a predetermined period of time. This is accomplished by alternately connecting the ion chamber 5 between two conditions first, across a power supply means 11 and, second, in a condition in which the center electrode 15 is permitted to float for a predetermined period of time. During this period of time the electrodes 15 and 17 are maintained at the potential differences placed upon them by the power supply means 11 due to the ion chamber capacity, except for the decaying of the charge as a result of incident radiations. The radiations will ionize the gas within the ion chamber 5, the electrons liberated in the formation of the ions will be attracted to the positive electrode and the ions will migrate to the negative electrode, thus discharging the ion chamber 5 in proportion to the amount of radiation received by the ion chamber 5. In the embodiment shown in Figure 1, the outer electrode 17 is connected to the positive terminal of the power supply means 11 and the center electrode 15 is connected to the negative terminal of the power supply means 11. At the end of the predetermined time period, the charge on the ion chamber 5 is then conducted, by operation of the switching means 13, to the input side of the direct current amplifier 7, thereby producing an impulse which, when amplified by the amplifier 7, will actuate the recording type, ballistic, indicating instrument 9. By the use of automatically operable switching means, these operations are caused to take place automatically and in proper sequence, and they may be continued for as long a period as is desired. Further, since the collecting period may be extended to periods of minutes, or even hours, it becomes possible to use the apparatus to measure and record radiations which produce a current of lower magnitude than the normal control current of the amplifier. This procedure, in effect, increases the sensitivity of the apparatus far beyond the normal sensitivity of the component parts thereof.

The ion chamber 5 is shown diagrammatically in Fig. 1, and it may be of any conventional type. It includes a hollow outer electrode 17, conveniently of cylindrical form, which is permeable to the radiation which it is desired to measure, an inner or collecting electrode 15 which conveniently comprises a solid metallic rod located centrally of the outer electrode 17, and a voltage gradient reducing shield 19 which conveniently comprises a short metallic tube located in the region where the inner electrode 15 passes out of the chamber. The ion chamber 5 is sealed, and for maximum sensitivity, it should be gas-filled and the inner or collecting electrode should be as highly insulated as is possible. Argon and some other of the inert gases are suitable gases, and for maximum sensitivity the gas should be maintained at as great a pressure as is possible.

The power supply unit 11 is likewise of conventional design, and preferably is of an electron-tube type with voltage stabilizing means embodied therein. The power supply unit 11 shown in Fig. 1 is energized from an ordinary 115 volt, 60 cycle supply line, and is arranged to deliver 250 volts D. C. at the output terminals thereof. The negative side of the power supply output is grounded, and the positive side is connected by the conductor 21 to the outer electrode 17 of the ion chamber 5. The ion chamber shield 19 is also grounded, as illustrated.

The recording type indicating instrument 9 should include a ballistic movement which is substantially dead-beat and which gives a full scale indication with about 20 to 25 microamperes flowing through the instrument. Particularly suitable are the recording type instruments manufactured by the General Electric Company, which include a photoelectric amplifying and pen control system intermediate a sensitive galvanometer unit, which is arranged to receive the input to the instrument, and the recording pen. These instruments give full scale deflection for an input current of 20 microamperes. The pen unit moves sidewise of a paper tape which is advanced by a constant speed clock unit. The pen attains full scale position in approximately .6 second, and the pen assembly is completely dead-beat. Such an instrument is indicated at 9 in Fig. 1, and is shown as being energized from an external source of alternating current power.

While any of the known types of direct current amplifiers can be used in conjunction with the apparatus of the invention, the most satisfactory results are obtained by the use of a two-stage, electron tube amplifier which utilizes a low inter-electrode capacity pentode of the type normally employed for detector or amplifier use in the first stage thereof, and which utilizes a conventional medium inter-electrode capacity pentode amplifier in the second stage thereof. The "Acorn-type" pentode sold under the distinguishing number 959 is exemplary of the tubes which are suitable for the first stage, and the pentode 1A5 is exemplary of the tube types which are suitable for use in the second stage.

In the particular amplifier illustrated in Fig. 1, there is one very important departure from conventional practices is direct current amplifier circuits. Specifically, suppressor grid 33 of the No. 959 Acorn tube is used as the control grid, and the conventional control grid 34 is connected to the negative side of the filament 31, the conventional connection for the suppressor grid. The novel features of the amplifier are more fully described and claimed in the copending application of Darol K. Froman, William H. Hinch and Richard J. Watts, Serial No. 646,947, filed February 11, 1946. This arrangement of the grids coupled with a substantial readjustment of the tube operating potentials has been found to greatly increase the sensitivity of the amplifier to small currents. The normal operating current of the suppressor grid of the 959 tube is approximately $10^{-13}$ amperes and is substantially constant over a reasonable range of grid voltages.

Considering the amplifier circuit in detail, the various operating voltages are supplied by means of a series of resistances which are connected to constitute a voltage divider. These resistances include a wire wound tapped resistor 23 of approximately 5000 ohms total resistance, which is connected at one end to the positive bus 21, and is connected at the other end to the positive side of the filament 25 of the 1A5 or second amplifier tube. The negative side of the filament 25 is connected to one end of a 200 ohms resistance 27, which supplies the proper bias on the screen grid 29 of the 959 tube in the first stage of the amplifier, and the other end of that resistance 27 is connected to the positive side of the filament 31 of the 959 tube. The negative side of the filament 31 of the 959 tube is connected to ground through a grid bias resistance 32 for the grid 33, which is used as the control grid for that tube, of 120 ohms.

The plate 35 for the 959 tube is operated at a potential of only about 8 volts above that of the negative side of the filament 31 of that tube, and this voltage is obtained by connecting the plate 35 to the upper end of the main voltage divider resistance 23 through a 1 megohm plate load resistor 37 and a variable connection 39. The suppressor grid 33 of the 959 tube, which is used as the control grid, is connected to ground through a grid-leak resistor 41 having a resistance of $10^{12}$ ohms, and during normal operating conditions, the grid 33 will be maintained at a voltage approximately 6 volts below the voltage of the negative side of the filament 31, this bias voltage being provided by the resistor 32.

The suppressor grid 43 of the 1A5 tube in the second-stage is connected to the negative side of the filament 25 of that tube, as illustrated. The control grid 45 is tied to the plate 35 of the first stage tube, and the screen grid 47 is maintained at a potential approximately 90 volts above that of the negative side of the filament 25 by means of a variable tap 49 into the main section of the voltage divider. The plate 51 of the second amplifier tube is connected to the positive voltage bus 21 through a 30,000 ohms loading resistance 53 which provides a potential at the plate 51 of approximately 120 volts. The positive input terminal 55 for the indicating instrument 9 is connected to the plate 51 of the second-stage amplifier tube through a 20,000 ohm resistance 57, and the negative terminal 59 is connected to a suitable point on the voltage resistance 23 by means of a variable tap 61.

The operation of the amplifier circuit apart from the novel arrangement followed in connecting the first amplifier or electrometer tube and the voltage charges required by this arrangement, is more or less conventional. The application of a positive potential to the control grid 33 of the 959 first stage or electrometer tube causes an increase in the plate current flowing through that tube. The increase in plate current flowing through the tube is a function of the characteristics of the tube itself. The grid 33 of the tube is carefully insulated from the other elements of the circuit to avoid leakage currents, since leakage to ground will decrease the potential difference between the center electrode and ground and result in unstable readings which will indicate higher radiation than the radiation actually existing. Since the current in the grid circuit of the 959 tube is exceedingly small, it does not cause any appreciable lowering of grid potential. An increase in the voltage drop across the plate load resistor 37 results from the increase in plate current, and this voltage drop decreases the potential on the plate 35 of the 959 tube and on the control grid 45 of the 1A5 tube in the second stage of the amplifier, which grid is tied to the plate 35. A decrease in the plate current of the 1A5 tube results from the decrease of potential on the control grid 45 of the 1A5 tube. The current flow through the plate load resistor 53 for the 1A5 tube is likewise decreased, and as a result the voltage applied to the terminals of the recording instrument 9 is increased.

Since the application of any charge collected on the collecting electrode 15 to the control grid 33 of the 959 tube in the first amplifier stage thus decreases the amplifier output, the recording instrument and the various circuit elements are adjusted so that the zero setting of the instrument corresponds to the normal full scale position of the recording pen, or other indicating element. This adjustment can be conveniently effected by adjustment of the potential applied to the screen grid 47 of the 1A5 tube by means of the variable connection 49, and by adjustment of the variable connection 61 which controls the voltage applied to the recording instrument 9. The amplifier is preferably surrounded by a grounded electrostatic shield, not shown. This may conveniently comprise a sheet metal enclosure of the conventional type.

The switching means 13 is arranged to accomplish a certain desired sequence of operations. First, it is operable to ground the collecting electrode 15 of the ion chamber 5 for a short interval of time; it is then operable to isolate that electrode for a predetermined interval of time during which period the control grid 33 of the first stage tube in the direct current amplifier 7 is maintained at ground potential; and upon the elapse of the predetermined time interval, the switching means 13 is operable to disconnect the control grid 33 of the first amplifier tube from ground and to connect that grid to the collecting electrode 15 of the ion chamber in order that the charge accumulated thereon may be conducted to that grid. This charge raises the potential of the grid 33 so as to provide an impulse which when amplified by the amplifier accomplishes ballistic movement of the indicating instrument. Since the switching means 13 is automatically operable to effect this series of connections in a successive and repetitive manner, the operation of the apparatus becomes substantially automatic, and once the proper collecting interval and speed of the recording tape have been selected, the apparatus will automatically obtain any desired series of readings.

Various types of switching arrangements operable to accomplish the sequence of operation set forth above may obviously be devised. An exemplary arrangement is shown diagrammatically in Fig. 1. This includes a pair of battery operated magnetic contactors or relays 63 and 65. The relay 63 is a single pole single throw type, normally biased to the open position shown in the drawings, and operable when energized to close the relay contacts 66 and 67. The contacts 66 and 67 are connected by conductors 69 and 70 so as to connect the collecting electrode 15 of the ion chamber to ground when the relay 63 is closed. The energizing battery 71 for this relay is connected to the relay operating coil 72 through a pair of normally separated spring contacts 73 and 74 which are adapted to be moved to the closed position for a short interval of time by the rotation of a cam wheel 75 which is driven in counterclockwise direction by a variable speed motor 77.

The other relay 65 is of the single pole, double-throw type and is normally biased to the position shown in Fig. 1. When in this position the movable contact arm 79 provides a circuit from the control grid 33 of the first amplifier tube to ground through the contact 80 and the conductor 81. When the operating coil 87 for this relay is energized, the contact arm 79 moves out of contact with the contact 80, which is connected to ground, and into contact with the other relay contact 85 which is connected to the collecting electrode 15 of the ion chamber 5, as illustrated. This operation thus disconnects the control grid 33 of the first amplifier tube from ground and immediately thereafter connects that grid to the collecting electrode 15 of the ion chamber. The operating coil 87 for the relay 65 is adapted to be energized by a suitable battery 89 through a second pair of normally separated, spring relay contacts, 91 and 92. These contacts 91 and 92 are closed at a predetermined interval of time following the operation of the other relay 63 by means of a second cam operating wheel 93, which is also driven by the motor 77. The cam operating wheel 93 is driven in the clockwise direction, and it is intended that its position may be angularly adjusted relative to the other cam operating wheel 75 in order that the collecting interval may be varied to suit any particular condition.

To minimize disturbances in the system incident to relay operation, it is desirable that the relays 63 and 65 shall be of a relatively sensitive type, and that the entire switching and relay structure be enclosed in a grounded sheet metal shield (not shown). It is also desirable to provide a resistance across the relay operating coils, as illustrated at 95, to minimize disturbances incident to inductive decay following each operation of the relays 63 and 65.

Since extremely small currents are handled in these devices, the insulation at the relay contacts 66, 79, 80, and 85 must be particularly good, and it is recommended that amber or some equivalent material be employed between these contacts and all conductors which are maintained at ground or at some other potential. Likewise the reliability and sensitivity of the system is dependent to a large extent upon the quality of the insulation maintained at the collecting electrode 15 of the ion chamber 5. It is essential that the best of available materials be used at this point, and it is not recommended that attempts be made to use the apparatus unless an ion chamber having a highly insulating collecting electrode is available. In general, it appears that insulation which provides a resistance between the collecting electrode and the other electrode of the ion chamber of the order of $10^{15}$ ohms or more is satisfactory for the measurement of currents of the order of $10^{-14}$ amperes in a circuit such as has been described.

During the operation of the apparatus, the power should be turned on for a sufficient period to stabilize the amplifier tubes and the recording type indicating instrument. The collecting period should be adjusted by relative angular movement of the operating cams 75 and 93, or by changes in the speed of the driving motor 77 for those cams, to provide a collecting period for the ion chamber which will yield approximately full scale deflection for the maximum ion current which will be encountered.

Adjustment of the speed of the recording tape may also be found desirable. If the apparatus is being used to take a series of readings which will not vary substantially over a considerable period of time, it may be found desirable to operate the tape feed of the recording instrument at low speed, thereby spacing the individual ballistic swings of the recording pen relatively close together. Such a recording is illustrated in Fig. 3. In other instances, it may be desired to space the readings apart a substantial distance on the recording tape, as when it is desired to observe a rapidly changing phenomenon, and in such instances the speed of the tape should be such that the individual indications are separated by a substantial interval, this type of reading being illustrated by the reproduction of a tape sample which appears in Fig. 2.

The apparatus described above finds particular utility for the continuous measurement of radiation intensities, as for example, in the measurement and recording of the intensities of the radiations emanated by a radioactive material during the decay period thereof. When so used, a sample of the radioactive material will be placed in proximity to the ion chamber 5, with such shields as may be necessary, to obtain the desired ion intensity within the chamber. With the apparatus so arranged, the successive and repetitive character of the readings obtained, by virtue of the completely automatic operation of the switching means 13, makes possible a complete series of intensity readings, extending over a period of hours or even days. Furthermore, these readings may be obtained with almost no supervision of the apparatus. The automatic character of the apparatus cannot be too strongly emphasized, since this is one of the most troublesome deficiencies of prior known structures. The reproduction of the sample tape appearing in Fig. 3, illustrates the type of tape which might be expected during a series of radioactive decay measurements made over a period of some hours. In instances where the decay proceeds at a very rapid rate, higher speed movement of the recording tape will be used, and the recordings may resemble those shown in Fig. 2.

A very important feature of the invention resulting from the method of operation and the circuit arrangement disclosed is the ability of the apparatus to measure average currents (which persist for a reasonable period of time) of the order of $10^{-14}$ amperes, or less, by the use of an electron tube, direct current amplifier employing tubes which individually require a control current of at least $10^{-13}$ amperes. This is a most important characteristic of the apparatus and method of the invention, because it permits ultrasensitive devices to be constructed from commercially available materials, and in fact, makes possible a device whose overall sensitivity is 10 or even 100 times as great as the sensitivity of the component elements thereof. The features of the invention which are believed to be new are expressly pointed out in the accompanying claims.

What is claimed is:

1. The method of continuously measuring and recording small ion currents with an ionization chamber circuit having, in series, an ionization chamber, a constant potential power source, and a high impedance comprising the steps of repetitively connecting the ionization chamber across the power source to charge the chamber, disconnecting the ionization chamber from the power source and electrically isolating the chamber from other electrical elements for a constant period of time, and connecting the ionization chamber, high impedance and power source in a series circuit.

2. Apparatus for the measurement of small ion currents having an ionization chamber circuit including an ionization chamber, a high impedance, and a constant potential power source, an amplifier having an input connected across the high impedance and an output, and indicating means connected to the output of the amplifier characterized by the construction comprising switching means disposed between the ionization chamber and the high impedance, said switching means repetitively connecting the ionization chamber aross the constant potential power source, disconnecting the ionization chamber from the power source and isolating the chamber from the other electrical elements of the circuit for a constant period of time, and connecting the ionization chamber is a series circuit with the constant potential power source and the high impedance.

3. Apparatus for the measurement of radiation comprising, in combination: an ion chamber having an insulated center electrode, a source of electrical charge, means to measure electrical charge, and a synchronous repetitious switching mechanism firstly connecting the ion chamber to the source of charge, secondly disconnecting it, and thirdly connecting it to the means to measure the electrical charge, said mechanism including a shaft, means to rotate the shaft at a constant rate, two cam wheels attached to the shaft, two electrical switches normally in an open position. each switch having an activating member, and said activating member being mounted to engage a cam at least once upon each rotation of that cam wheel, one of said switches connecting the means to measure the electrical charge alternately to the center electrode of the ion chamber and to ground and the other of said switches connecting the center electrode of the ion chamber to ground.

4. Apparatus for the measurement of radiation comprising, in combination: an ion chamber having an insulated center electrode, a source of electrical charge, means to measure electrical charge including an amplifier and a recording instrument, and a synchronous repetitious switching mechanism firstly connecting the ion chamber to the source of electrical charge, secondly disconnecting it, and thirdly connecting it to the means to measure electrical charge, said mechanism including a shaft, means to rotate the shaft at a constant rate, two cam wheels attached to the shaft, two electrical switches normally in an open position, each switch having an activating member and said activating member being mounted to engage a cam at least once on each rotation of that cam wheel, one of said switches connecting the means to measure the electrical charge alternately to the center electrode of the ion chamber and to ground, and the other of said switches connecting the center electrode of the ion chamber to ground.

WILLIAM P. JESSE.
JAMES W. BROXON.
WILLIAM H. HINCH.

REFERENCES CITED

The following references are of record in the file of this patent:

UNITED STATES PATENTS

| Number | Name | Date |
|---|---|---|
| 1,035,204 | Leich et al. | Aug. 13, 1912 |
| 1,855,669 | Glasser et al. | Apr. 26, 1932 |
| 2,081,074 | Strauss | May 18, 1937 |
| 2,122,222 | Vengerhoets | June 28, 1938 |
| 2,220,602 | Hellmann | Nov. 5, 1940 |
| 2,343,885 | Coleman | Mar. 14, 1944 |
| 2,351,028 | Fearon | June 13, 1944 |
| 2,361,295 | Kanner et al. | Oct. 24, 1944 |

OTHER REFERENCES

Queen, "Radio-Craft," July 1944, pages 602, 603.